United States Patent
Bush

[11] 3,727,226
[45] Apr. 10, 1973

[54] NAVIGATION AID
[75] Inventor: Elsmore W. Bush, La Jolla, Calif.
[73] Assignee: Cubic Corporation, San Diego, Calif.
[22] Filed: July 21, 1971
[21] Appl. No.: 164,500

[52] U.S. Cl. .........................343/112 PT, 343/113 R
[51] Int. Cl. ................................................G01s 5/08
[58] Field of Search ....................343/112 PT, 113 R

[56] References Cited
UNITED STATES PATENTS

| | | | |
|---|---|---|---|
| 1,433,070 | 10/1922 | Conners | 343/112 PT |
| 3,184,740 | 5/1965 | Huckabay et al. | 343/112 PT |
| 2,595,315 | 5/1952 | Weihe | 343/112 PT |

Primary Examiner—Benjamin A. Borchelt
Assistant Examiner—Richard E. Berger
Attorney—Carl R. Brown et al.

[57] ABSTRACT

A simple navigation aid for use on a vessel to provide a continuous indication of the vessel's position directly on a chart, which is oriented to the local shoreline. Two head units, each containing a directional antenna are mounted on the chart to pivot about the marked positions of two known radio transmitters, the antennas being coupled to a two channel receiver tuned to the selected transmitters. Each head unit contains an extensible and retractable tape member and the two tape members are pivotally connected at their extremities. The tape members are driven in and out in response to signals representing the boresight errors of the antennas and, when the antennas are locked on to the respective transmitters, the tape members form the apex of a triangle from the transmitters to the position of the vessel.

16 Claims, 8 Drawing Figures

INVENTOR.
ELSMORE WILLIAM BUSH
BY Brown & Martin
ATTORNEYS

PATENTED APR 10 1973 3,727,226

INVENTOR.
ELSMORE WILLIAM BUSH

BY Brown & Martin

ATTORNEYS

NAVIGATION AID

BACKGROUND OF THE INVENTION

The technique of plotting the position of a vessel by radio direction finding is well known. Usually a directional antenna coupled to a receiver is turned until a maximum signal or a null signal is obtained from a known transmitter, and the direction or bearing is noted. This is repeated with another transmitter at a different location. The reciprocals of the bearings are then drawn on a chart from the positions of the transmitters located, the intersection of the lines showing the vessels position. On a small boat in rough water, accurate bearings may be difficult to take and the procedure is not particularly convenient.

Radar and other specialized navigation systems are more accurate and are mostly automatic or near automatic in operation, but the cost is prohibitive for general use in small boats.

SUMMARY OF THE INVENTION

The apparatus described herein is simple, low in cost and provides a direct indication of the vessel's position on a chart with minimum operating procedure. Two known radio transmitters are used as references and a chart showing their positions is oriented to north on the vessel to correspond in alignment to the local shoreline. Two small head units are mounted on the chart, each being secured to pivot about the marked position of a selected transmitter. Each head unit contains a directional antenna which is connected to one channel of a two channel receiver tuned to the transmitters. The receiver contains circuitry for developing signals corresponding to the alignment errors of the antennas with the respective transmitters. Each head unit has a rolled tape member which can be extended and retracted by a motor in response to the error signals from the other head unit. The two tape members are pivotally interconnected at their extremities, to form a triangle with the base line between the head units. Any misalignment of an antenna from the null position with respect to its related transmitter, will cause the tape member of the other head unit to be driven and swing the first head unit until its antenna is in nulled alignment. When both antennas are in null positions, the tape members will form the apex of a triangle from the transmitters to the position of the vessel. Thus the pivotal junction of the tape members will indicate the position of the vessel directly on the chart. The apparatus can be operated continuously or at suitable intervals to plot the progressive course of the vessel.

It is therefore an object of this invention to provide a new and improved navigation aid.

It is another object of this invention to provide a new and improved navigation aid which indicates the position of a vessel directly on a chart, which is directionally oriented with respect to the local shoreline.

It is another object of this invention to provide a new and improved navigation aid in which null seeking directional antennas are mounted on a chart at locations of two known radio transmitters, and are interconnected by movable tape members which form the apex of a triangle with the transmitters when the antennas are nulled, the apex point representing the position of the vessel on the chart.

It is another object of this invention to provide a new and improved navigation aid which is low in cost, semiautomatic in operation and is particularly suitable for use in small boats.

Other objects and many advantages of this invention will become more apparent upon a reading of the following detailed description and an examination of the drawings wherein like reference numerals designate like parts throughout and in which.

DESCRIPTION OF THE PREFERRED EMBODIMENT

Figure 1:
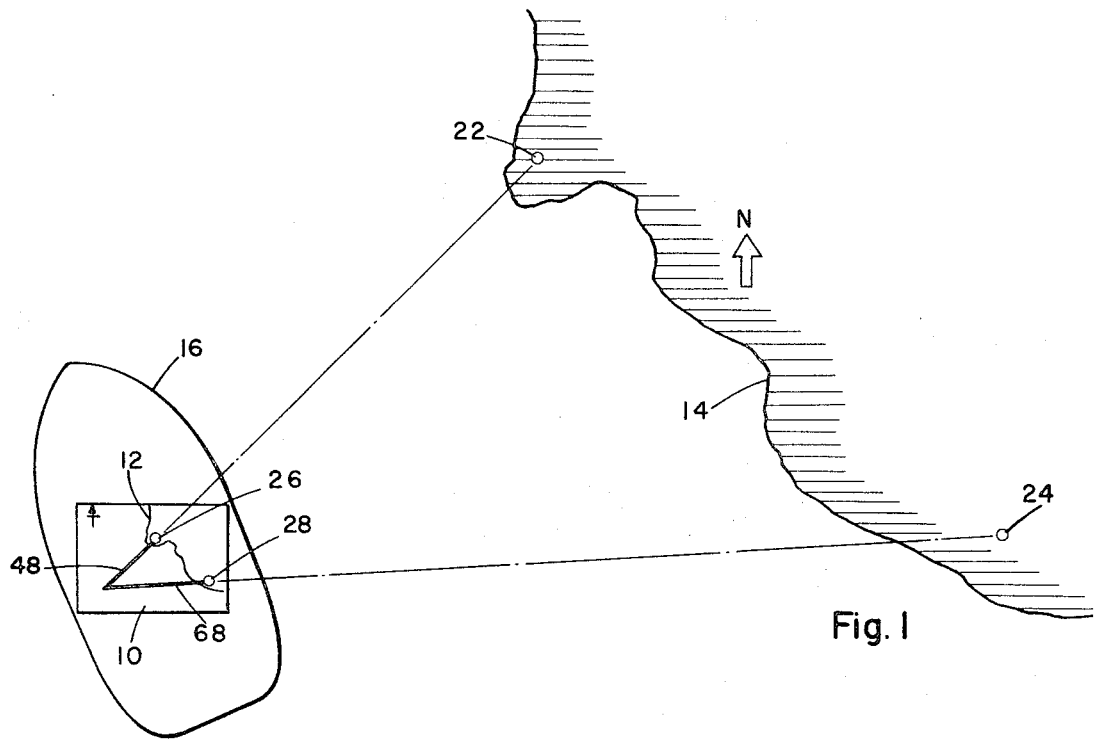
FIG. 1 is a diagram showing the relation of a vessel and chart to a shoreline.
Figure 2:
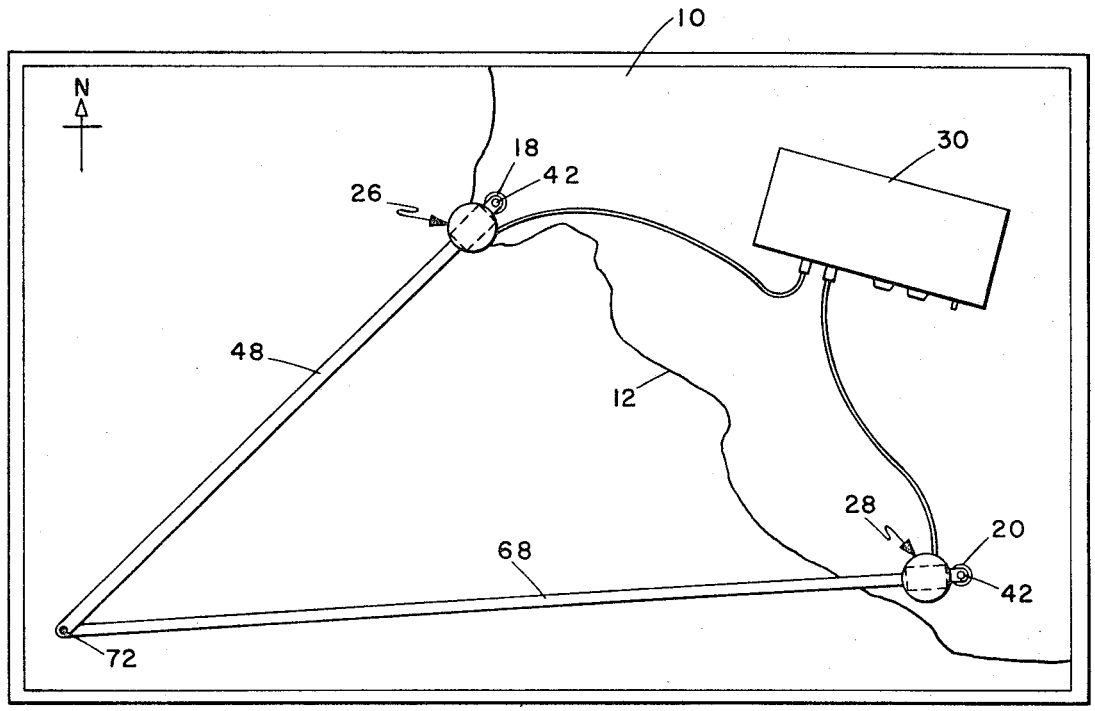
FIG. 2 is a representation of the chart with the head units in position.
Figure 3:
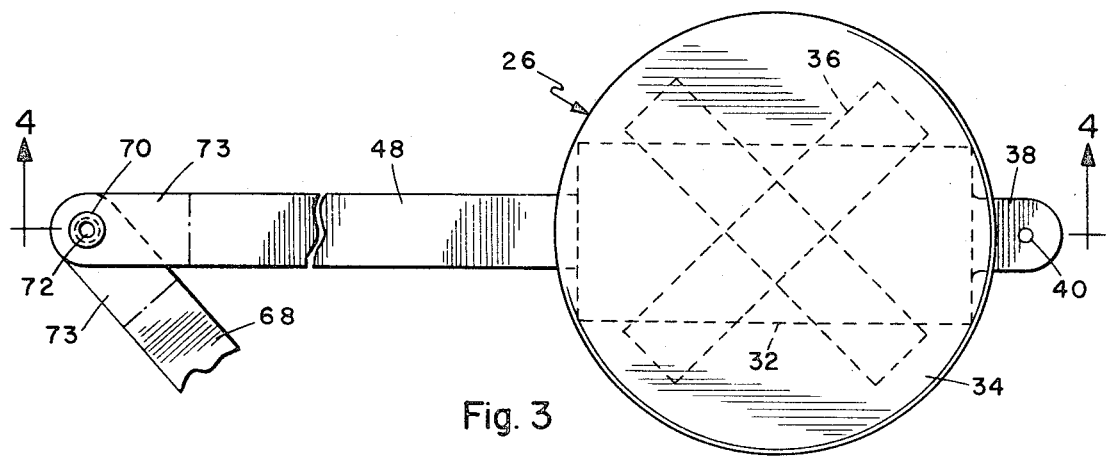
FIG. 3 is a top plan view of one head unit.
Figure 4:
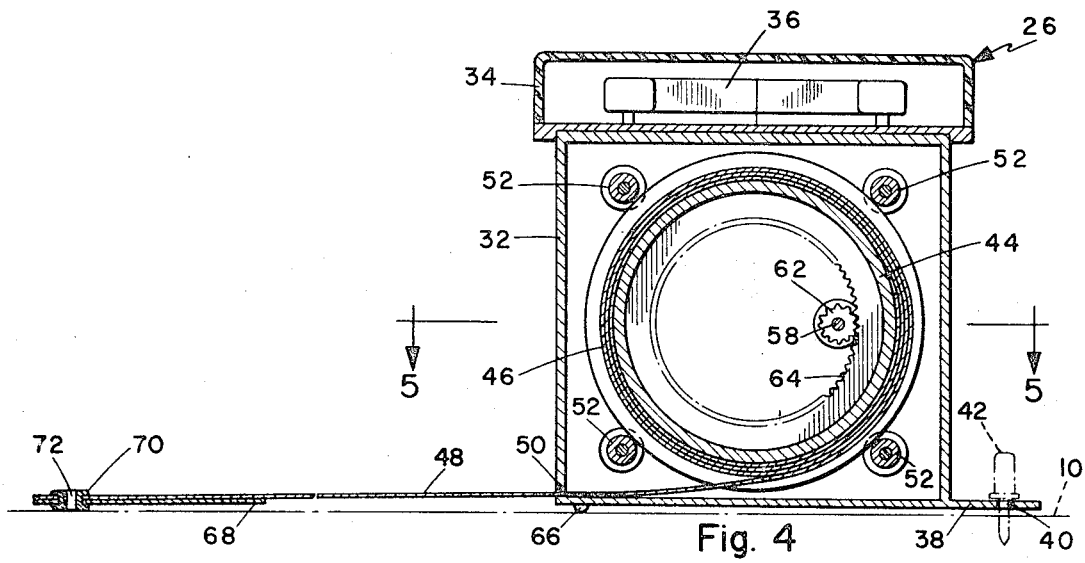
FIG. 4 is a sectional view taken on line 4—4 of FIG. 3.
Figure 5:
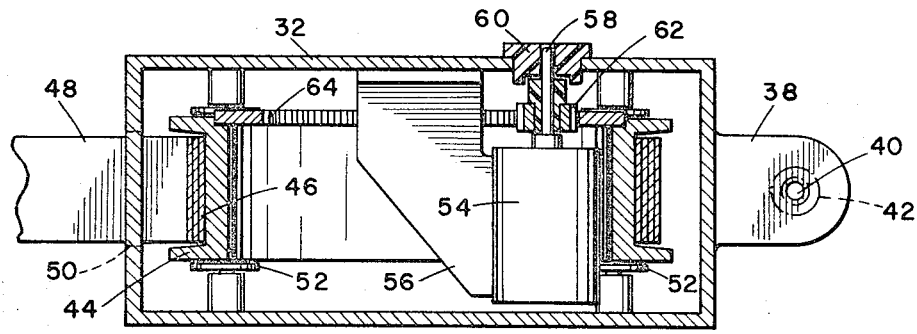
FIG. 5 is a sectional view taken on line 5—5 of FIG. 4.

As illustrated in FIGS. 1 and 2, the apparatus is used in conjunction with a chart 10, showing a shoreline profile 12 corresponding to the actual local shoreline 14. The chart is carried on a vessel 16 and is oriented to coincide with north alignment by reference to the vessel's compass. On the chart are two marked locations 18 and 20, corresponding to known radio transmitters 22 and 24 on shore.

The apparatus comprises a pair of identical head units 26 and 28, which are attached to the chart at marked locations 18 and 20, respectively, and a receiver 30 to which the head units are connected. The receiver can be placed on the chart, as indicated, or at any convenient location nearby.

A typical head unit 26 comprises a box-like casing 32, on top of which is a housing 34 containing a directional antenna 36. The antenna shown is a readily available cruciform type, but other compact types with suitable directional characteristics may be used. At the bottom of casing 32 is a tongue 38 extending from one end, the tongue having a pivot hole 40 on a vertical plane through the null or boresight axis of the antenna 36. The unit is secured to the chart 10 by a pin 42 through pivot hole 40 and into the appropriate marked transmitter location, so that, as the unit swings about the pin, the antenna boresight axis will always pass through the marked location.

Inside casing 32 is a cylindrical drum 44 having a circumferential channel 46 to hold an elongated tape member 48 wound on the drum. The tape member is of the type used in measuring tapes and is reasonably stiff when extended, either by making the member slightly arcuate in cross section or incorporating a stiffening rib. At the bottom of casing 30, in the end opposite tongue 38, is a slot 50 through which the tape member 48 extends in the direction of the antenna boresight axis. Drum 44 is suspended between flanged rollers 52 to roll smoothly and freely. The drum is driven by a servo motor 54 which is mounted on a bracket 56 secured to the casing, the servo motor having a shaft 58 journalled in a bearing 60 in the side of the casing for added support. Secured on shaft 58 is a pinion 62, which engages an internal ring gear 64 fixed in the drum 44. Servo motor 54 is a low voltage reversible type, very little power being needed to extend and retract the tape member.

To reduce friction, small feet 66 are provided on the underside of casing 32 opposite the tongue 38. Roller bearings could be used, but the unit is light in weight and slides readily without causing buckling of the tape member.

Head unit 28 is similar in all respects and has a tape member designated by numeral 68 for purposes of description. The extended ends of tape members 48 and 68 are pivotally connected by a hinge pin, such as the eyelet 70, which could be made removable for convenience. The tubular eyelet shown makes it a simple matter to mark a position on the chart through the eyelet opening 72, which is at the precise intersection of the tape members and, therefore, at the intersection of the antenna boresight lines. For ease of viewing the chart at the indicated location of the vessel, the tip portions 73, at least, of the tape members could be made transparent.

From FIG. 2 it will be evident that head unit 26 is swung about its pivot by extension and retraction of tape member 68. Head unit 28 is similarly swung by movement of tape member 48. Thus the signals received by the antenna of one unit actually control the servo motor of the other unit, in order to move the antenna to a null position, boresighted on the respective transmitter.

Figure 6:
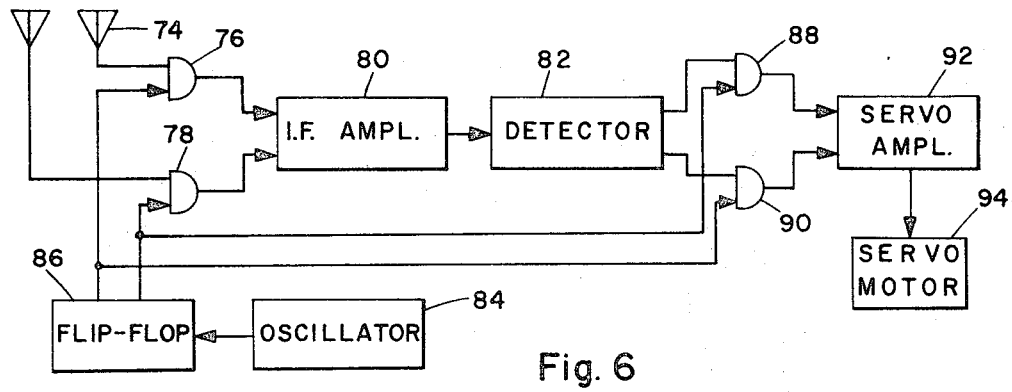
FIG. 6 is a block diagram of one channel of the circuit.

A typical operating circuit for one unit is shown in FIG. 6, in which the antenna 74 is connected through a pair of AND gates 76 and 78 to an intermediate frequency (I.F.) amplifier 80 and a detector 82. An oscillator 84 drives a flip-flop circuit 86, which is coupled to the AND gates to open the gates and pass the antenna received signals in timed pulses. The output of detector 82 is connected to a pair of AND gates 88 and 90, which are also opened in synchronization by flip-flop 86, to feed the signals to a servo amplifier 92. The basic circuit is well known and compares the amplitudes of the signals received by the two antenna elements, the detector 82 supplying a maximum-minimum signal to the servo amplifier. The servo amplifier is an operational amplifier of conventional type including an integrating circuit, which provides a positive or negative DC output corresponding to the amplitude difference of the incoming signals. The servo motor 94, which is in the other head unit, is thus driven in the appropriate direction until antenna 74 is boresighted on the transmitter and the incoming signal is nulled.

Figure 7:
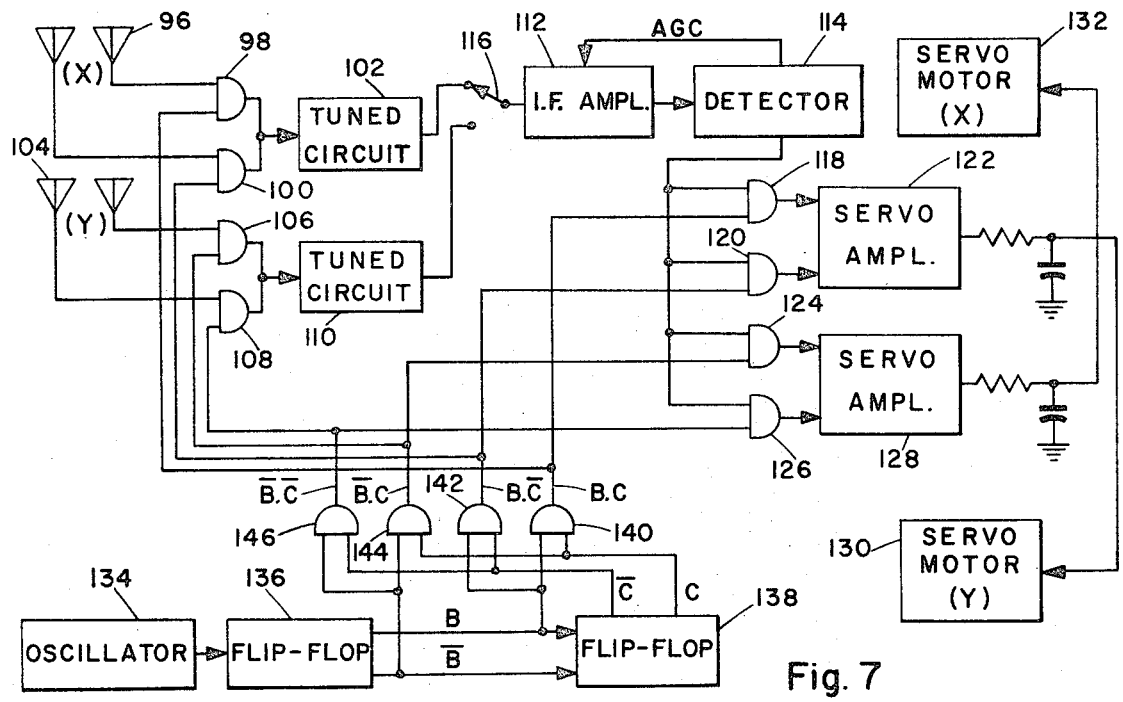
FIG. 7 is a block diagram of the complete circuit.

In the complete circuit of the two units, illustrated in FIG. 7, antenna 96 (X) is connected through a pair of AND gates 98 and 100 to a tuned circuit 102. Antenna 104 (Y) is similarly connected through a pair of AND gates 106 and 108 to a tuned circuit 110. The tuned circuits can be incorporated as two channels in the receiver with means for individual tuning to specific transmitters being used as references. More conveniently, the tuned circuits could be plug in modules pretuned to known transmitters in the vicinity. This would facilitate quick changing of reference transmitters on an extended trip. The tuned circuits 102 and 110 are individually connected to an IF amplifier 112 and detector 114 through a selector switch 116. Output from detector 114 is applied through a pair of AND gates 118 and 120 to drive a servo amplifier 122, and through a pair of AND gates 124 and 126 to drive a servo amplifier 128. Servo amplifier 122 provides driving power to servo motor 130 (Y) and servo amplifier 128 provides driving power to servo motor 132 (X), selective operation being controlled by the signal gating circuitry.

An oscillator 134 drives a flip-flop circuit 136, which is coupled to a second flip-flop 138 operating at twice the rate of the first. Signals from flip-flop 136 are fed through a pair of AND gates 140 and 142 to gates 98 and 100 and gates 118 and 120, respectively. Signals from flip-flop 138 are fed through a pair of AND gates 144 and 146 to gates 106 and 108 and gates 124 and 126, respectively. AND gates 140 and 142 are triggered by signals from flip-flop 138, while AND gates 144 and 146 are triggered by signals from flip-flop 136. Thus specific combinations of signals from the two flip-flops will ensure that each antenna provides controlling signals only to its associated servo motors.

Figure 8:
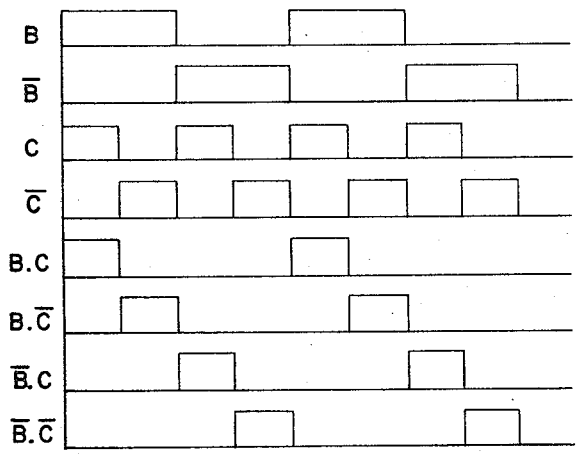
FIG. 8 is a graph showing the timing of the gated signals.

With reference to FIG. 8 and the lower portion of FIG. 7, it can be seen that flip-flop 136 produces signal pulses B and alternating pulses $\bar{B}$ at one rate. Flip-flop 138 produces pulses C and alternating pulses $\bar{C}$ at twice the rate of the B pulses, so that the combined signals at the four gates 140 – 146 are stepped in sequence. Related gates 98 and 118 are thus triggered in sychronization only by the combined signal B.C from gate 140, and gates 100 and 120 are triggered only by the combined signal B.$\bar{C}$ from gate 142. Similarly, gates 106 and 124 are triggered only by combined signal $\bar{B}$.C from gate 144, and gates 108 and 126 are triggered only by combined signal $\bar{B}.\bar{C}$ from gate 146. The distinctive gated signals ensure that signals received by antenna (X) in one unit control only the servo motor (Y) in the second unit, and signals received by antenna (Y) in the second unit control only the servo motor (X) in the first unit.

The apparatus is set up as in FIGS. 1 and 2 by pinning the units 26 and 28 to the selected transmitter positions on the chart 10, and connecting the units to receiver 30. Chart 10 is then oriented to north by referring to the vessel's compass. Receiver 30 is then switched, as by switch 116, to connect the antenna in unit 26 into the circuit. Any misalignment of the antenna with the associated transmitter 22 will cause tape member 68 to be extended or retracted, causing unit 26 to be turned until the antenna is aligned and the signal is nulled. When motion of the tape member ceases, switch 116 is actuated to couple the antenna of unit 28 into the circuit. Tape member 48 is then driven until unit 28 is aligned with its associated transmitter. The switch is operated once or twice more to allow for deviations caused by changes in the included angle between the tape members as one or the other unit is operated. When no more motion of either tape member occurs, the location of the vessel is indicated on the chart through eyelet opening 72, at the apex of the triangle between the vessel and the two transmitters. The process is quite rapid in process and can be repeated as necessary to provide successive plots of the vessel's progress. In a more sophisticated form of the apparatus, the selector switch could be cycled automatically to provide a continuous plot of the vessel's position.

Having described my invention, I now claim.

1. A navigation aid for indicating the position of a vessel on a chart carried on the vessel, the chart being directionally oriented with relation to the corresponding shoreline and having thereon position markers of two selected local radio transmitters, the navigation aid comprising:

a pair of head units each having means for pivotal attachment to the chart at one of the position markers;

each head unit having a directional antenna therein;

receiver means coupled to said antennas to receive signals therefrom and provide outputs corresponding to deviations of the antennas from alignment with their respective transmitters;

an elongated tape member in each of said head units, with drive means for selectively extending and retracting the tape member along the plane of the directional axis of the antenna therein;

the extended ends of said tape members being pivotally interconnected;

and said drive means being connected to the outputs of said receiver means and the drive means in each unit being responsive to the signals received by the antenna in the other unit.

2. A navigation aid according to claim 1, wherein each of said head units includes a casing, with a housing thereon in which the antenna is mounted;

a drum rotatably mounted in said casing, said tape member being wound on said drum.

3. A navigation aid according to claim 2, wherein the lower portion of said casing has a slot in one end through which said tape member extends;

said means for pivotal attachment comprising a tongue projecting from said casing opposite said slot, with a pivot pin receiving hole therein on the plane of the directional axis of the antenna.

4. A navigation aid according to claim 3, wherein said casing has freely rotatable rollers therein, between which said drum is rotatably mounted, said drum having an internal ring gear;

said drive means comprising a reversible motor having a pinion engaging the ring gear.

5. A navigation aid according to claim 1, wherein the pivotal interconnection of the tape members comprises a hinge pin having an opening therein on the pivotal axis.

6. A navigation aid according to claim 1, wherein the interconnected end portions, at least, of said tape members are transparent.

7. A navigation aid according to claim 1, wherein said drive means comprises a reversible servo motor in each head unit;

said receiver having a pair of servo amplifiers coupled to said servo motors and providing driving power signals thereto;

and control means in said receiver for applying signals from each antenna only to the associated servo amplifier.

8. A navigation aid according to claim 7, wherein said control means includes signal gating means controlling the input signals from each antenna to said receiver, and corresponding gating means controlling the input signals to each of said servo amplifiers;

and a source of distinctive timed control signals connected to the gating means to actuate the related gating means in synchronization.

9. A navigation aid according to claim 7, wherein said receiver has a pair of tuned circuits individually tuned to receive signal from one of the selected transmitters;

and switch means for connecting said tuned circuits selectively between the respective antennas and the receiver circuitry.

10. A navigation aid according to claim 9, wherein said control means includes signal gating coupled between each antenna and its related tuned circuit, and corresponding signal gating means connected to control the inputs to each servo amplifier;

and a source of distinctive controlling signals coupled to said gating means for actuating the associated gating means at each antenna and the related servo amplifier in synchronization.

11. A navigation aid according to claim 10, wherein said source of controlling signals includes an oscillator and a pair of flip-flop circuits driven by said oscillator at different pulse rates to provide timed control signals;

said flip-flop circuits being connected in different combinations to each of the synchronously paired gating means.

12. A head unit for use in a navigation aid, comprising:

a casing;

a directional antenna mounted on said casing;

an elongated tape member in said casing;

and drive means in said casing for extending and retracting said tape member substantially along the plane of the directional axis of said antenna.

13. A head unit according to claim 12, wherein said casing has a housing on the upper portion thereof, in which said antenna is contained.

14. A head unit according to claim 12, and including a drum rotatably mounted in said casing, said tape member being wound on said drum.

15. A head unit according to claim 14, wherein said casing has freely rotatable rollers mounted therein, between which said drum is rotatably supported;

said drum having an internal ring gear;

and said drive means comprising a reversible motor having a pinion engaging said ring gear.

16. A head unit according to claim 12, wherein the lower portion of said casing has a slot in one end through which said tape member extends;

and means for pivotal attachment of said casing to a supporting surface comprising a tongue projecting from the casing opposite said slot with a pivot pin receiving hole therein on the plane of the directional axis of the antenna.

* * * * *